April 16, 1929.   N. GHERASSIMOFF   1,709,718
METAL COVERED PNEUMATIC TIRE
Filed July 19, 1927   2 Sheets-Sheet 1
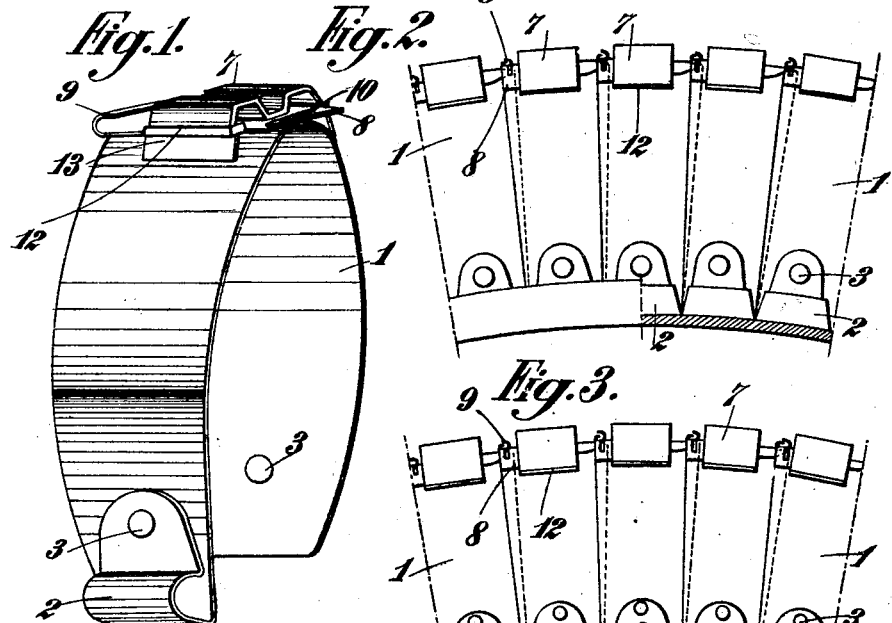
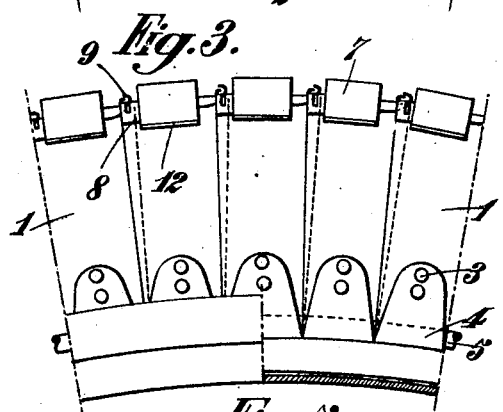
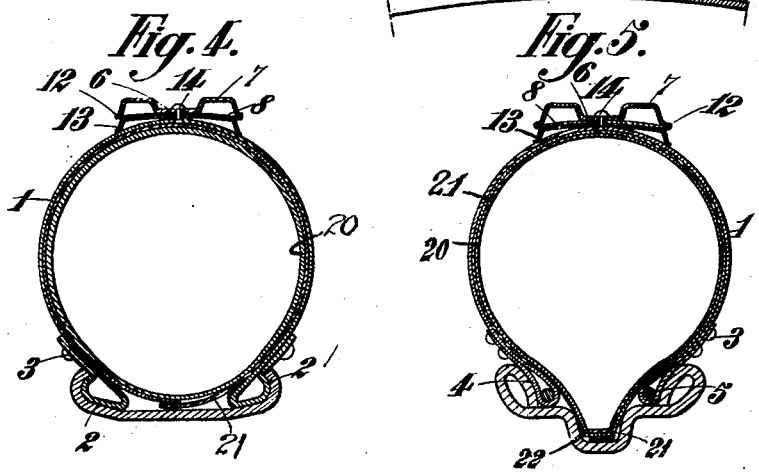
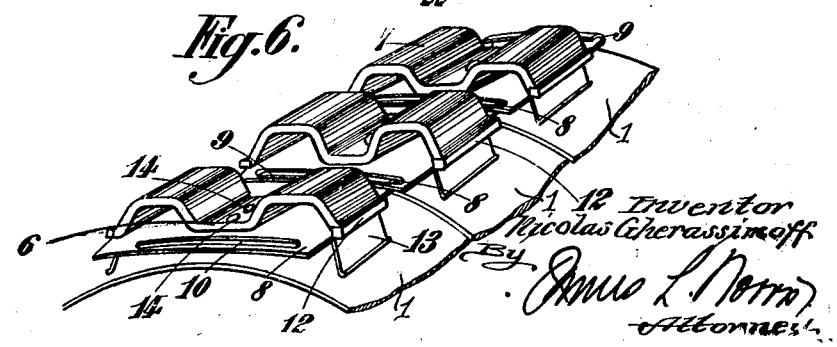
Inventor
Nicolas Gherassimoff April 16, 1929. N. GHERASSIMOFF 1,709,718
METAL COVERED PNEUMATIC TIRE
Filed July 19, 1927  2 Sheets-Sheet 2

Inventor
Nicolas Gherassimoff
By
Attorney

Patented Apr. 16, 1929.

1,709,718

UNITED STATES PATENT OFFICE.

NICOLAS GHERASSIMOFF, OF LE VESINET, FRANCE, ASSIGNOR OF ONE-HALF TO EUGENE RIVOCHE, OF PARIS, FRANCE.

METAL-COVERED PNEUMATIC TIRE.

Application filed July 19, 1927, Serial No. 206,965, and in France January 24, 1927.

The present invention relates to improvements upon the metal covered pneumatic tire disclosed in my U. S. Patent No. 1,632,731, dated June 14, 1927, the object of these improvements being to simplify the construction of said tire and hence to lower the cost of manufacture, to eliminate various drawbacks which have been revealed in practice, to ensure better unison between its various units and to extend its application to many types of tires.

The tire according to my said patent is constituted by a series of flexible strips which are assembled together in order to form an outer cover for the inner tube without the use of any rubber outer cover such as those commonly utilized. These metallic strips overlap each other, are provided with bosses which form the tread-band, are furthermore reinforced by means of a rubber band covered with fabric at their ends which hook into the rim of the wheel and are connected together at their extremities by a metallic counter-plate riveted thereto.

According to the present invention said strips are linked together by simply hooking them in such manner as to permit of a slight relative movement between them. It should moreover be noted that the sliding action of the strips over each other during running is almost insignificant and that in consequence there is no need to leave considerable play between them.

According to a characteristic feature of the invention, the strips are connected together by providing one edge of each strip with a hook at one edge and a slot at its opposite edge in such wise that the hook of one strip shall slip into the slot of the next succeeding strip, the slots being of sufficient width to allow of slight play of the hooks and a relative displacement of the strips.

According to one embodiment of the invention the hooks and slots are formed on plates separate from the strips, said plates being secured to the strips by any suitable means such as rivets, bolts and the like.

The invention consists furthermore in bending back the ends of the strips so as to form protuberances constituting beads of requisite dimensions to be lodged and hooked in the rim, the end of each extremity being secured by riveting to the strip itself.

According to another embodiment of the invention, the extremities of the strips are bent over into the form of beads, the ends of these extremities being riveted to the body of the strip and all the strips of the tire being connected together by means of rods which successively pass through all the beads situated on the same side of the tire, in order that the tire may be applied to a rim having a peripheral groove or depression.

According to the invention the tire is provided with a tread-band held in position by the hooking plates, salient ledges being for this purpose formed on the edges of said plates, said tread-band being made either in one piece or in several pieces corresponding to the number of strips provided.

According to a constructional form of the tread-band, this latter is formed by pressed plates of small height having ribs which constitute the tread-band proper, each strip including a plate which is lodged and kept in place between the salient ledges of the hooking plates.

With a view to rendering the strips more flexible, springs of any suitable form are inserted between the hooking plates and strips, the whole formed by the pressed plate, the hooking plate and the spring, being secured to the strip by means of two or more fixing rivets located along the median line of the pressed plate.

According to a modified construction, the tread-band is constituted by a rubber band covering the hooking plates and having projecting portions passing through apertures in the said hooking plates so as to come between each hooking plate and the corresponding strip in order to render this latter more elastic, the rubber band being moreover cut out at the places where the hooks and slots are located.

Finally, the sheath which is inserted between the tire and the inner tube may be arranged so that its edges overlap.

Embodiments of the invention are illustrated, but merely by way of example in the accompanying drawings.

In these drawings:

Fig. 1 is a perspective view of a complete flexible strip made according to the invention.

Fig. 2 shows in side elevation part of a tire according to the invention mounted on a beaded rim, part of the rim being shown in section.

Fig. 3 is a view similar to Fig. 2 showing the tire as applied to a rim having a peripheral groove or depression.

Fig. 4 is a cross-sectional view of a tire according to the invention, adapted to be mounted on a clencher rim.

Fig. 5 is a similar view to that of Fig. 4 of a tire adapted to be mounted on a rim having a peripheral grove or depression.

Fig. 6 is a detail view showing in perspective the arrangement of the ribbed plates on the tire.

Figure 7:
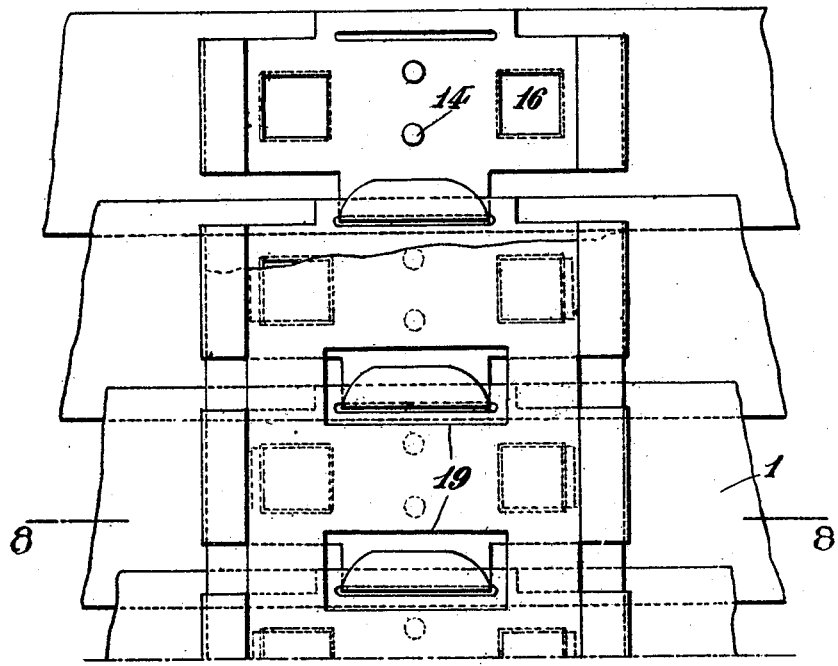
Fig. 7 is a fragmentary plan view of a tire with a rubber treadband.

As shown in Figures 1, 2 and 4 of the drawings, the extremities of the strips 1 are bent back on themselves so as to form beads 2, the endmost part of each of these extremities being furthermore bent over so as to lie against the strip to which it is preferably secured by means of a rivet 3. This type of bead is particularly useful when the tire is to be mounted on a beaded rim, but naturally would not be suitable to be mounted on a rim having a peripheral groove or depression in its base or upon a rim of which one of the edges is detachable. For these rims, covers of the "rod" type are utilized, having metal rods within their beads, as shown in Figures 3 and 5, which give to the bead of the cover a diameter less than that of the rim edge, thereby preventing the cover from springing out of the rim. It would of course be possible to so construct the tire that it might be mounted either on a rim having a peripheral groove or depression in its base, or on a rim with a detachable edge. For this purpose, the extremities of the strips 1 are not bent over to form beads of the character shown in Figs. 1 and 2, but are bent to form beads of the character shown at 4 in Figures 3 and 5, and are secured to the body of the strip by means of one or two rivets 3. A rod 5 is then passed through these beads 4, preferably after the various elements making up the tire have been assembled together, and after mounting said tire on a mandrel.

The tread-band of this tire according to Figs. 1 to 6 is constituted by pressed plates 6 having two ribs of small height 7, each plate 6 being borne by a strip 1.

The strips 1 are all hooked together and, to this end, the plates 6 are provided on opposite sides with slots and hooks. Preferably, these hooks are formed on plates 8 inserted respectively between the strips 1 and the corresponding plates 6. These plates 8 are each formed at one side with a hook 9 and at the opposite side with a slot 10.

In addition, the free edges of the plates 8, that is to say those which do not include either hook or slot, are turned up as shown at 12 so as to form a frame in which the corresponding pressed plate 6 is lodged.

On assembling the parts a spring 13, which may be a blade spring, is inserted between each plate 8 and the associated strip 1, and the pressed plates 6 are then laid down by lodging them in the frames formed on the plates 8 by the ledges 12. The whole formed by the pressed plate 6, the plate 8 and the spring 13 is then secured to the strip 1 by means of two or more fixing rivets 14 which will only be sunk in the non-ribbed portion of the plate 6 i. e. between the ribs 7. In this way a considerable measure of suppleness and flexibility will be obtained, because the ribs 7 and plates 8 will have two elastic points of support on the strips.

Figure 8:
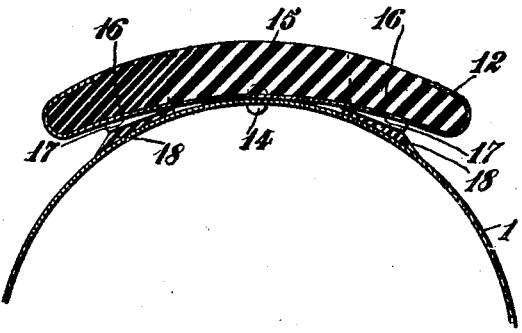
Fig. 8 is a section along the line 8—8 of Fig. 7.

According to the modified construction shown in Figures 7 and 8 the saliant ledge 12 of the hooking plate 8 is of rounded U cross-section and houses the edges of a rubber band 15. The hooking plates have openings 16 stamped out in them with inwardly projecting walls 17 so as to receive salient portions 18 formed on the rubber band 15. These salient portions 18 project through and beyond the walls 17 of the openings 16 and their lower faces are rounded so as to fit the periphery of the strips 1 on which they are made to bear. Each hooking plate is secured to a strip 1 by means of two or more rivets 14, as in the preceding case, and apertures 19 are cut out of the rubber band in the vicinity of the hooks in order to enable these latter to slide freely in the slots.

It will be readily understood that the rubber band, which is kept in position by the hooking plates and which, through the medium of the salient portions 18, bears on the strips 1, forms a unit in which the properties of flexibility and firmness are combined.

As has been said, the strips 1 overlap each other slightly at their edges and, in order to protect the inner tube 20 against accidental nipping between these strips, a sheath 21 formed by a canvas band, of which the edges overlap at 22, is preferably interposed between said strips and the inner tube.

The tire thus formed is easy to manufacture, since all the strips which make it up are obtained by cutting out and pressing, and it is absolutely reliable owing to the manner in which all its units work in correlation with one another. Moreover, there is no likelihood that the inner tube will be nipped owing to the fact that there is no discontinuity in the inner surface of the tire, even during the flexing of the strips during running; the lining 21, moreover, prevents any rubbing of the inner tube against the metallic strips.

The devices shown could of course be subjected to various modifications in detail without departing from the spirit of the invention.

I claim:

1. A wheel tire comprising, in combination, a plurality of flexible metal outer strips adapted to enclose an inner tube, each extremity of each strip being adapted to engage in a rim-flange, a plate mounted on each of said strips, and means for hooking each of said plates to the next succeeding one.

2. A wheel tire comprising, in combination, a plurality of metal outer strips adapted to enclose an inner tube, each extremity of each strip being bent for engagement into a rim-flange, a tread-band mounted on said strips, means for elastically supporting said tread-band on said strips and means for successively hooking said metal strips together.

3. A wheel tire comprising, in combination, a plurality of metal outer strips adapted to enclose an inner tube, each extremity of each strip being bent for engagement into a rim-flange, a plate mounted on each of said strips, a hook formed on one side of said plate, a slot formed in the opposite side of said plate for engagement with the hook of the next succeeding plate, salient ledges formed on each of said plates and a tread-band to said tire maintained in position between the salient ledges on said plates.

4. A wheel tire comprising, in combination, a plurality of metal outer strips adapted to enclose an inner tube, each extremity of each strip being bent for engagement into a rim-flange, a plate mounted on each of said strips, a hook formed on one side of said plate, a slot formed in the opposite side of said plate for engagement with the hook of the next succeeding plate, salient ledges formed on each of said plates, a tread-band to said tire maintained in position between the salient ledges on said plates and an elastic support located between said plates and said strips.

5. A wheel tire comprising, in combination a plurality of metal outer strips adapted to enclose an inner tube, each extremity of each strip being bent for engagement into a rim-flange, a plate mounted on each of said strips, a hook formed on one side of said plate, a slot formed in the opposite side of said plate for engagement with the hook of the next succeeding plate, salient ledges formed on each of said plates, an elastic tread-band to said tire maintained in position between the salient ledges on said plates, and salient portions to said elastic tread-band adapted to bear against the surface of said metal strips over certain portions thereof.

6. A wheel tire comprising, in combination, a plurality of metal outer strips adapted to enclose an inner tube, each extremity of each strip being bent for engagement into a rim-flange, a plate mounted on each of said strips, a hook formed on one side of said plate, a slot formed in the opposite side of said plate for engagement with the hook of the next succeeding plate, salient ledges formed on each of said plates, an elastic tread-band covering said plates and maintained in position between the salient ledges thereof, depending bosses studded over said tread-band, and apertures in said plates through which said depending bosses project and bear against said strips.

NICOLAS GHERASSIMOFF.